(12) United States Patent
Lu et al.

(10) Patent No.: US 10,481,405 B2
(45) Date of Patent: Nov. 19, 2019

(54) THREE DIMENSION DISPLAY DEVICE AND CONTROLLING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Pengcheng Lu, Beijing (CN); Xue Dong, Beijing (CN); Xiaochuan Chen, Beijing (CN); Ming Yang, Beijing (CN); Qian Wang, Beijing (CN); Lei Wang, Beijing (CN); Rui Xu, Beijing (CN); Jian Gao, Beijing (CN); Xiaochen Niu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/519,615

(22) PCT Filed: Jan. 5, 2016

(86) PCT No.: PCT/CN2016/070122
§ 371 (c)(1),
(2) Date: Apr. 17, 2017

(87) PCT Pub. No.: WO2017/028482
PCT Pub. Date: Feb. 23, 2017

(65) Prior Publication Data
US 2018/0149877 A1    May 31, 2018

(30) Foreign Application Priority Data
Aug. 20, 2015 (CN) .......................... 2015 1 0514237

(51) Int. Cl.
*G02B 27/22* (2018.01)
*H04N 13/30* (2018.01)
(Continued)

(52) U.S. Cl.
CPC ......... *G02B 27/22* (2013.01); *G02B 27/0093* (2013.01); *G02B 27/2214* (2013.01);
(Continued)

(58) Field of Classification Search
None
See application file for complete search history.

(56) References Cited

U.S. PATENT DOCUMENTS 9,188,788 B2 * 11/2015 Kim .................. G02B 27/2214
2004/0257495 A1   12/2004 Hattori et al.
(Continued)

FOREIGN PATENT DOCUMENTS

CN         1573435 A      2/2005
CN       102710956 A     10/2012
(Continued)

OTHER PUBLICATIONS

First Office Action for Chinese Application No. 201510514237.6, dated Jan. 5, 2017, 9 Pages.
(Continued)

*Primary Examiner* — Lindsay J Uhl
(74) *Attorney, Agent, or Firm* — Brooks Kushman P.C.

(57) ABSTRACT

A 3D display device includes a display panel for displaying an image and a grating structure cooperating with the display panel to provide a 3D display effect. The grating structure includes a plurality of gratings capable of being switched between a transparent state and a nontransparent state. The 3D display device further includes: an eye tracking unit configured to acquire positions of eyes of a viewer; and a control unit connected to the eye tracking unit and
(Continued)

configured to control the gratings to be switched between the transparent state and the nontransparent state in accordance with the positions of the eyes of the viewer, to enable a left eye of the viewer to view a first view displayed on the display panel through the grating structure and enable a right eye of the viewer to view a second view displayed on the display panel through the grating structure.

12 Claims, 5 Drawing Sheets

(51) Int. Cl.
| | | |
|---|---|---|
| *G06F 3/01* | (2006.01) | |
| *H04N 13/32* | (2018.01) | |
| *H04N 13/312* | (2018.01) | |
| *H04N 13/315* | (2018.01) | |
| *H04N 13/366* | (2018.01) | |
| *H04N 13/398* | (2018.01) | |
| *G02B 27/00* | (2006.01) | |

(52) U.S. Cl.
CPC ............ *G06F 3/013* (2013.01); *H04N 13/30* (2018.05); *H04N 13/312* (2018.05); *H04N 13/315* (2018.05); *H04N 13/32* (2018.05); *H04N 13/366* (2018.05); *H04N 13/398* (2018.05)

(56) References Cited

U.S. PATENT DOCUMENTS

| | | | |
|---|---|---|---|
| 2010/0073465 A1 | 3/2010 | Park et al. | |
| 2013/0321246 A1* | 12/2013 | Li | G09G 3/003 345/31 |
| 2014/0098010 A1* | 4/2014 | Travis | G02B 26/005 345/32 |
| 2015/0070476 A1* | 3/2015 | Wei | H04N 13/31 348/54 |
| 2016/0198150 A1 | 7/2016 | Meng et al. | |
| 2016/0274372 A1 | 9/2016 | Tian | |
| 2017/0059959 A1 | 3/2017 | Wu et al. | |

FOREIGN PATENT DOCUMENTS

| | | |
|---|---|---|
| CN | 103760677 A | 4/2014 |
| CN | 104122692 A | 10/2014 |
| CN | 104155824 A | 11/2014 |
| CN | 104252058 A | 12/2014 |
| CN | 104749825 A | 7/2015 |
| CN | 105093546 A | 11/2015 |
| CN | 105100783 A | 11/2015 |
| KR | 20140089677 A | 7/2014 |

OTHER PUBLICATIONS

Second Office Action for Chinese Application No. 201510514237.6, dated Jun. 7, 2017, 5 Pages.
International Search Report and Written Opinion for Application No. PCT/CN2016/070122, dated May 18, 2016, 11 Pages.

* cited by examiner

THREE DIMENSION DISPLAY DEVICE AND CONTROLLING METHOD THEREOF

CROSS-REFERENCE TO RELATED APPLICATION APPLICATIONS

This application is the U.S. national phase of PCT Application No. PCT/CN2016/070122 filed on Jan. 5, 2016, which claims priority to Chinese Patent Application No. 201510514237.6 filed on Aug. 20, 2015, the disclosures of which are incorporated in their entirety by reference herein.

TECHNICAL FIELD

The present disclosure relates to the field of three dimension (3D) display technology, in particular to a 3D display device and a controlling method thereof.

BACKGROUND

A main principle of the 3D display technology lies that different images are received by a left eye and a right eye of a viewer respectively and then analyzed and combined by the viewer's brain, so as to enable the viewer to sense a depth of the image, thereby to provide a 3D effect.

Currently, naked-eye 3D technologies have been developed and studied. Among them, as a common one, a parallax barrier 3D display technology includes a barrier 3D display technology and a liquid crystal lens 3D display technology. For the barrier 3D display technology, light beams are blocked by a black matrix (BM) or any other electrochromic material as a grating, so as to enable the corresponding light beams to be received appropriately by viewer's eyes. For the liquid crystal lens 3D display technology, a liquid crystal panel, a polarizer and a polymer liquid crystal layer are switched on or off, and a difference in potentials at electrodes on an upper substrate and a lower substrate is controlled so as to form a series of vertical stripes, which are called as "parallax barrier". Due to inherent defects of a splitter, a current device using the naked-eye 3D technology is of a complicated structure and a large thickness. More seriously, crosstalk and viewing dead zone may occur for the device. Due to these defects, the 3D effect and a comfort degree may be adversely affected.

As shown in FIG. 1, which is a schematic view showing a structure and a light path for a 3D display device in the related art, the 3D display device includes a backlight, a grating and a display panel. The backlight is used to light up the 3D display device, the grating is used to split the light beams from the backlight to ensure that different light beams are received by the left and right eyes of the viewer, and the display panel is used to display an image. In FIG. 1, H represents a height of the display panel during the 3D display, S represents a distance between the viewer's eye and the display panel, i.e., a viewing distance, and L represents a distance between the left and right eyes of the viewer, i.e., an interpupillary distance. Commonly, view 1 is viewed by the left eye of the viewer, image 2 is received by the right eye of the view, the brain of the viewer combine the two images to generate a 3D image.

As shown in FIG. 2, which is a schematic view showing a principle of the generation of a 3D dead zone in the related art, in the case that the viewer moves from a left position to a right position shown in FIG. 2 and each of the viewer's eyes is moved by a distance equal to the interpupillary distance, the viewer's left eye may be moved to a position where the right eye was located, and the viewer's right eye may be moved to a position where the left eye was located. A view 2 displayed on the display panel may be viewed by the viewer's left eye, and a view 1 displayed on the display panel may be viewed by the viewer's right eye. At this time, the viewer's eyes are located at the dead zone, i.e., the image that should have been viewed by the right eye may be viewed by the left eye, and the image that should have been viewed by the left eye may be viewed by the right eye. As a result, dizziness and emesis may occur for the viewer, and thereby the 3D effect may be adversely affected.

SUMMARY

A technical problem to be solved by the present disclosure is to provide a 3D display device and a controlling method thereof, so as to simplify the structure of the 3D display device and reduce a thickness thereof, prevent the occurrence of dead zone and reduce the crosstalk, thereby to improve the 3D effect and the comfort degree.

In one aspect, the present disclosure provides in some embodiments a 3D display device, including a display panel for displaying an image and a grating structure cooperating with the display panel to provide a 3D display effect. The grating structure includes a plurality of gratings capable of being switched between a transparent state and a nontransparent state. The 3D display device further includes: an eye tracking unit configured to acquire positions of eyes of a viewer; and a control unit connected to the eye tracking unit and configured to control the gratings to be switched between the transparent state and the nontransparent state in accordance with the positions of the eyes of the viewer, to enable a left eye of the viewer to view a first view displayed on the display panel through the grating structure and enable a right eye of the viewer to view a second view displayed on the display panel through the grating structure.

In a possible embodiment of the present disclosure, the control unit includes: a first controller configured to apply a first signal to the display panel, so as to enable a plurality of first pixel units spaced apart from each other on the display panel to display the first view and enable a plurality of second pixel units each arranged between the adjacent first pixel units on the display panel to display the second view; and a second controller configured to apply a second signal to the grating structure, so as to enable a plurality of first gratings of the grating structure spaced apart from each other to be in the transparent state and enable a plurality of second gratings of the grating structure each arranged between the adjacent first gratings to be in the nontransparent state.

In a possible embodiment of the present disclosure, the grating structure is a backlight arranged at a rear side of the display panel and including a plurality of light-emitting units arranged separately, and the light-emitting unit forms the grating in the transparent state in the case of emitting light and the grating in the nontransparent state in the case of not emitting light.

In a possible embodiment of the present disclosure, the control unit further includes a third controller configured to adjust a size of the light-emitting unit in accordance with a distance between the backlight and the display panel and a distance between the viewer's eyes and the display panel.

In a possible embodiment of the present disclosure, the light-emitting unit is of a circular, rectangular or trapezoidal shape.

In a possible embodiment of the present disclosure, the backlight source is a white organic light-emitting diode (OLED) display screen or a red-green-blue OLED display screen. In the case that the backlight source is the white OLED display screen, the display panel includes a color filter, and in the case that the backlight source is the red-green-blue OLED display screen, the display panel includes no color filter.

In a possible embodiment of the present disclosure, the light-emitting unit includes n OLED pixel units in an identical column, and during the 3D display, the OLED pixel units on the OLED display screen are turned on alternately in such a manner that the OLED pixel units in one column are in a dark state and the OLED pixel units in an adjacent column are in a bright state.

In a possible embodiment of the present disclosure, the light-emitting unit includes m*n OLED pixel units in m adjacent columns, and during the 3D display, the OLED pixels units on the OLED display screen are turned on alternately in such a manner that the OLED pixel units in m columns are in a dark state and the OLED pixel units in m adjacent columns are in a bright state.

In another aspect, the present disclosure provides in some embodiments a method for controlling a 3D display device. The 3D display device includes a display panel for displaying an image and a grating structure cooperating with the display panel to provide a 3D display effect. The grating structure includes a plurality of gratings capable of being switched between a transparent state and a nontransparent state. The method includes steps of: acquiring positions of eyes of a viewer; and controlling the gratings to be switched between the transparent state and the nontransparent state in accordance with the positions of the eyes of the viewer, to enable a left eye of the viewer to view a first view displayed on the display panel through the grating structure and enable a right eye of the viewer to view a second view displayed on the display panel through the grating structure.

In a possible embodiment of the present disclosure, the step of controlling the gratings to be switched between the transparent state and the nontransparent state in accordance with the positions of the eyes of the viewer, so as to enable the left eye of the viewer to view the first view displayed on the display panel through the grating structure and enable the right eye of the viewer to view the second view displayed on the display panel through the grating structure includes: applying a first signal to the display panel, so as to enable a plurality of first pixel units spaced apart from each other on the display panel to display the first view and enable a plurality of second pixel units each arranged between the adjacent first pixel units on the display panel to display the second view; and applying a second signal to the grating structure, so as to enable a plurality of first gratings of the grating structure spaced apart from each other to be in the transparent state and enable a plurality of second gratings of the grating structure each arranged between the adjacent first gratings to be in the nontransparent state.

In a possible embodiment of the present disclosure, the grating structure is a backlight arranged at a rear side of the display panel. The backlight includes a plurality of light-emitting units arranged separately, and the step of controlling the gratings to be switched between the transparent state and the nontransparent state includes turning on the light-emitting unit to form the grating in the transparent state and turning off the light-emitting element to form the grating in the nontransparent state.

In a possible embodiment of the present disclosure, prior to the step of controlling the gratings to be switched between the transparent state and the nontransparent state, the method further includes adjusting a size of the light-emitting unit in accordance with a distance between the backlight and the display panel and a distance between the viewer's eyes and the display panel.

In a possible embodiment of the present disclosure, each light-emitting unit includes n OLED pixel units in an identical column, and during the 3D display, the OLED pixel units on the OLED display screen are energized alternately in such a manner that the OLED pixel units in one column are in a dark state and the OLED pixel units in an adjacent column are in a bright state.

In a possible embodiment of the present disclosure, each light-emitting unit includes m*n OLED pixel units in m adjacent columns, and during the 3D display, the OLED pixels units on the OLED display screen are turned on alternately in such a manner that the OLED pixel units in m columns are in a dark state and the OLED pixel units in m adjacent columns are in a bright state.

According to the embodiments of the present disclosure, the eye tracking unit may acquire the positions of the eyes of the viewer, and the control unit may control the states of the grating structure in accordance with the positions of the eyes of the viewer, so as to switch the views. As compared with a conventional 3D display device, the 3D display device in the embodiments of the present disclosure includes no splitter such as a lens, so it is able to simplify the structure and reduce the thickness thereof, thereby to reduce the manufacture cost. In addition, it is able to adjust the grating structure in accordance with the positions of the eyes of the viewer, prevent the occurrence of the dead zone and reduce the crosstalk, thereby to improve the 3D effect and the comfort degree.

DETAILED DESCRIPTION OF THE EMBODIMENTS

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure will be described hereinafter in conjunction with the drawings and embodiments.

Crosstalk and a viewing dead zone may occur for a conventional naked-eye 3D technology. The present disclosure provides a 3D display device and a controlling method thereof, so as to simplify the structure of the 3D display device and reduce a thickness thereof, prevent the occurrence of dead zone and reduce the crosstalk, thereby to improve a 3D effect and a comfort degree.

Figure 3:
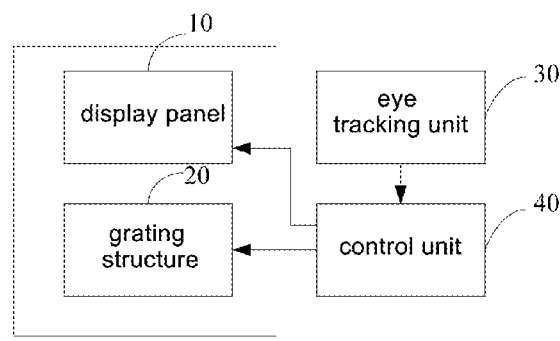
FIG. 3 is a schematic view showing a 3D display device according to at least one embodiment of the present disclosure.

The present disclosure provides in some embodiments a 3D display device which, as shown in FIG. 3, includes a display panel 10 for displaying an image and a grating structure 20 cooperating with the display panel 10 to provide a 3D display effect. The grating structure 20 includes a plurality of gratings capable of being switched between a transparent state and a nontransparent state. The 3D display device further includes: an eye tracking unit 30 configured to acquire positions of eyes of a viewer; and a control unit 40 connected to the eye tracking unit and configured to control the gratings to be switched between the transparent state and the nontransparent state in accordance with the positions of the eyes of the viewer, so as to enable a left eye of the viewer to view a first view displayed on the display panel through the grating structure and enable a right eye of the viewer to view a second view displayed on the display panel through the grating structure.

According to the embodiments of the present disclosure, the eye tracking unit may acquire the positions of the eyes of the viewer, and the control unit may control the states of the grating structure in accordance with the positions of the eyes of the viewer, so as to switch the views. As compared with a conventional 3D display device, the 3D display device in the embodiments of the present disclosure includes no splitter such as a lens, so it is able to simplify the structure and reduce the thickness thereof, thereby to reduce the manufacture cost. In addition, it is able to adjust the grating structure in accordance with the positions of the eyes of the viewer, prevent the occurrence of the dead zone and reduce the crosstalk, thereby to improve the 3D effect and the comfort degree.

The display panel may be a conventional two-dimensional (2D) display panel. The 3D display device in the embodiments of the present disclosure may also be used for 2D display, and during the 2D display, it is merely necessary to control all the gratings to be in the transparent state.

In a possible embodiment of the present disclosure, the control unit 40 includes: a first controller configured to apply a first signal to the display panel, so as to enable a plurality of first pixel units spaced apart from each other on the display panel to display the first view and enable a plurality of second pixel units each arranged between the adjacent first pixel units on the display panel to display the second view; and a second controller configured to apply a second signal to the grating structure, so as to enable a plurality of first gratings of the grating structure spaced apart from each other to be in the transparent state and enable a plurality of second gratings of the grating structure each arranged between the adjacent first gratings to be in the nontransparent state.

Through the cooperation of the first controller and the second controller, it is able for the left eye of the viewer to view the first view on the display panel through the grating structure and for the right eye of the viewer to view the second view on the display panel through the grating structure. In this way, it is able for the left and right eyes of the viewer to view different views which are then combined, in accordance with a 3D fusion principle, in the viewer's brain to form a 3D image, thereby to achieve the 3D effect.

In a possible embodiment of the present disclosure, the grating structure is a backlight (e.g., a light-emitting diode (LED) backlight) arranged at a rear side of the display panel and including a plurality of light-emitting units arranged separately, and light-emitting units form the grating in the transparent state in the case of emitting light and the grating in the nontransparent state in the case of not emitting light. The control unit may be used to control a light-emitting state of light-emitting units, so as to control the grating to be switched between the transparent state and the nontransparent state.

In a possible embodiment of the present disclosure, the control unit further includes a third controller configured to adjust a size of the light-emitting unit in accordance with a distance H between the backlight and the display panel and a distance S between the viewer's eyes and the display panel, so as to enable the size of the light-emitting unit to match an image displayed on the display panel, thereby to achieve the 3D display effect.

In a possible embodiment of the present disclosure, the light-emitting unit may be of a circular, rectangular or trapezoidal shape, which depends on the practical need for the 3D display.

In a possible embodiment of the present disclosure, the backlight is a white OLED display screen or a red-green-blue OLED display screen, and the light-emitting unit includes pixel units on the OLED display screen. Through the control over the OLED display screen, it is able to flexibly turn on or off each light-emitting unit. The OLED display screen includes OLED pixel units arranged in m rows and n columns. In the case that each light-emitting unit is of a rectangular shape, it may include n OLED pixel units in an identical column, or 4n OLED pixel units in four adjacent columns, or 5n OLED pixel units in five adjacent columns, which depends on the practical need for the 3D display. In the case that the backlight is the white OLED display screen, the display panel includes a color filter, and in the case that the backlight is the red-green-blue OLED display screen, the display panel includes no color filter.

Figure 4:
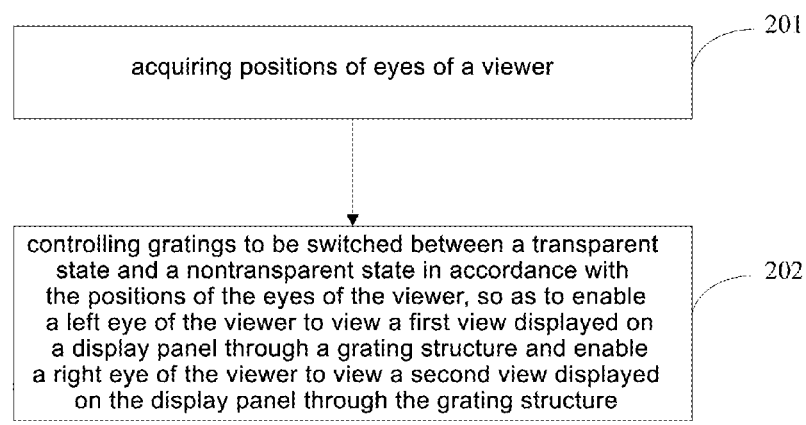
FIG. 4 is a flow chart of a method for controlling the 3D display device according to at least one embodiment of the present disclosure.

The present disclosure further provides in some embodiments a method for controlling a 3D display device. The 3D display device includes a display panel for displaying an image and a grating structure cooperating with the display panel to provide a 3D display effect. The grating structure includes a plurality of gratings capable of being switched between a transparent state and a nontransparent state. As shown in FIG. 4, the method includes: Step 201 of acquiring positions of eyes of a viewer; and Step 202 of controlling the gratings to be switched between the transparent state and the nontransparent state in accordance with the positions of the eyes of the viewer, so as to enable a left eye of the viewer to view a first view displayed on the display panel through the grating structure and enable a right eye of the viewer to view a second view displayed on the display panel through the grating structure.

According to the embodiments of the present disclosure, the positions of the eyes of the viewer may be acquired, and then the states of the grating structure may be controlled in accordance with the positions of the eyes of the viewer, so as to switch the views. As compared with a conventional 3D display device, the 3D display device in the embodiments of the present disclosure includes no splitter such as a lens, so it is able to simplify the structure and reduce the thickness thereof, thereby to reduce the manufacture cost. In addition, it is able to adjust the grating structure in accordance with the positions of the eyes of the viewer, prevent the occurrence of the dead zone and reduce the crosstalk, thereby to improve the 3D effect and the comfort degree.

In a possible embodiment of the present disclosure, the step of controlling the gratings to be switched between the transparent state and the nontransparent state in accordance with the positions of the eyes of the viewer, so as to enable the left eye of the viewer to view the first view displayed on the display panel through the grating structure and enable the right eye of the viewer to view the second view displayed on the display panel through the grating structure includes: applying a first signal to the display panel, so as to enable a plurality of first pixel units spaced apart from each other on the display panel to display the first view and enable a plurality of second pixel units each arranged between the adjacent first pixel units on the display panel to display the second view; and applying a second signal to the grating structure, so as to enable a plurality of first gratings of the grating structure spaced apart from each other to be in the transparent state and enable a plurality of second gratings of the grating structure each arranged between the adjacent first gratings to be in the nontransparent state. Through the cooperation of the first signal and the second signal, it is able for the left eye of the viewer to view the first view on the display panel through the grating structure and for the right eye of the viewer to view the second view on the display panel through the grating structure. In this way, it is able for the left and right eyes of the viewer to view different views which are then combined, in accordance with a 3D fusion principle, in the viewer's brain to form a 3D image, thereby to achieve the 3D effect.

In a possible embodiment of the present disclosure, the grating structure is a backlight (e.g., an LED backlight) arranged at a rear side of the display panel and including a plurality of light-emitting units arranged separately, and the step of controlling the gratings to be switched between the transparent state and the nontransparent state includes turning-on each light-emitting unit to form the grating in the transparent state and turning-off the light-emitting element to form the grating in the nontransparent state. Through the control over the light-emitting states of each light-emitting unit, it is able to switch the grating between the transparent state and the nontransparent state.

In a possible embodiment of the present disclosure, prior to the step of controlling the gratings to be switched between the transparent state and the nontransparent state, the method further includes adjusting a size of each light-emitting unit in accordance with a distance H between the backlight and the display panel and a distance S between the viewer's eyes and the display panel, so as to enable the size of the light-emitting unit to match an image displayed on the display panel, thereby to achieve the 3D display effect.

Figure 5:
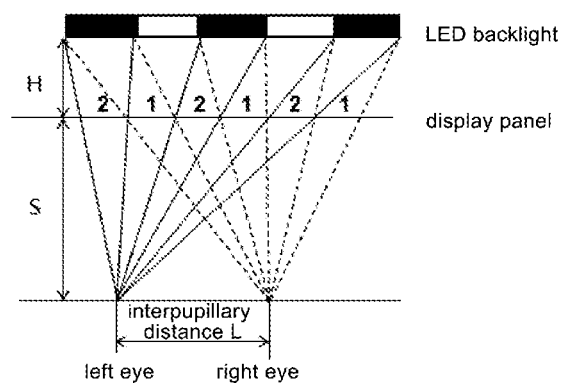
FIG. 5 is a schematic view showing a structure and a light path of the 3D display device according to at least one embodiment of the present disclosure.

As shown in FIG. 5, as compared with the conventional 3D display device, the 3D display device in the embodiments of the present disclosure includes no splitter such as a lens, and the grating structure is arranged at a rear side of the display panel. In addition, the grating structure is implemented by the LED backlight, and the size of the LED backlight matches the display panel. The LED backlight includes a plurality of light-emitting units arranged separately. Each light-emitting unit is equivalent to the grating in the nontransparent state in the case of not emitting light, and equivalent to the grating in the transparent state in the case of emitting light. Each light-emitting unit may be of a strip-like, block-like or circular shape. Regardless of the shapes of the light-emitting unit, it may be controlled separately so as to be in a bright or dark state. During the 3D display, the light-emitting unit in the dark state may serve as the grating. Light beams may be appropriately received by the left and right eyes of the viewer in accordance with a light path in FIG. 5. In this way, the left and right eyes of the viewer may view different views, which are then combined, in accordance with the 3D fusion principle, in the viewer's brain, so as to form the 3D image and achieve the 3D display effect.

Figure 6:
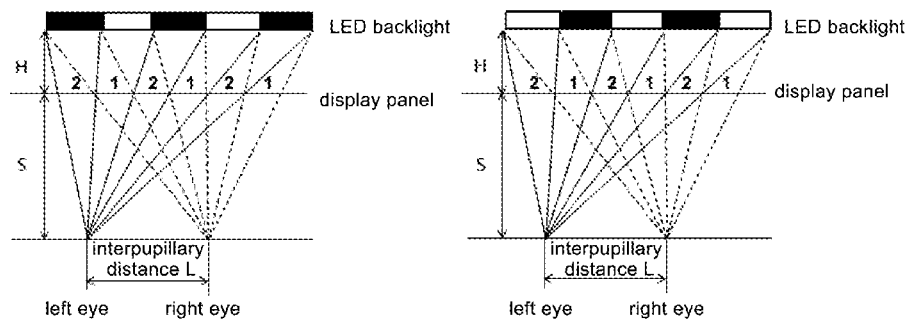
FIG. 6 is a schematic view showing a situation where the 3D dead zone is removed and crosstalk is reduced according to at least one embodiment of the present disclosure.

As shown in FIG. 6, which is a schematic view showing a situation where the 3D dead zone is removed and the crosstalk is reduced, in the case that the viewer is located at a position shown in the left view, the left eye of the viewer may view a view 1, and the right eye may view a view 2. In accordance with the 3D fusion principle, the viewer may view a normal 3D image. In the case that the viewer is moved from the position shown in the left view to a position shown in the right view, the eye tracking unit may acquire the positions of the eyes of the viewer. To be specific, the eye tracking unit may be implemented by a camera. In the case that a movement distance of the eyes of the viewer is just equal to an interpupillary distance, the left eye of the viewer may be moved to a position where the right eye should have been located, and the right eye of the viewer may be moved to a position where the left eye should have been located. At this time, the light-emitting unit of the LED backlight which should have been turned on may be turned off, and the light-emitting unit which should have been turned off may be turned on, i.e., the light-emitting units in the dark state and the bright state may be replaced with each other. In this way, even in the case that the left eye of the viewer has been moved to the position where the right eye should have been located, it may still view the view 1, and even in the case that the right eye of the viewer has been moved to the position where the left eye should have been located, it may still view the view 2. In other words, the normal 3D image may still be viewed and no dead zone may occur, so it is able to reduce the image crosstalk.

In the case that the movement distance of the eyes is not equal to the interpupillary distance, the control unit may still be used to adjust the light-emitting units of the LED backlight in the dark and bright states in accordance with the acquired movement distance of the eyes. At this time, regardless of the position where the viewer is moved, the left eye of the viewer may still view the view 1 and the right eye may still view the view 2. In this way, the normal 3D image may still be viewed and no dead zone may occur, so it is able to reduce the image crosstalk.

Figure 1:
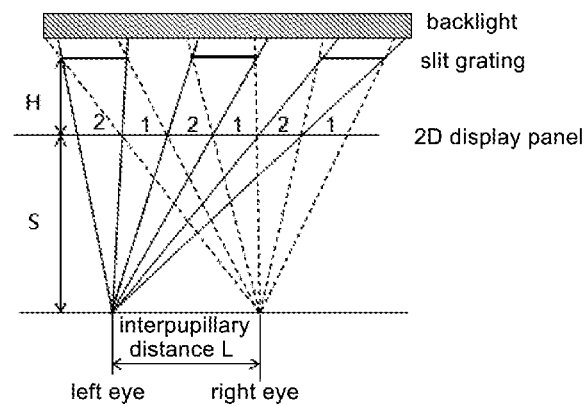
FIG. 1 is a schematic view showing a structure and a light path of a 3D display device in the related art.
Figure 2:
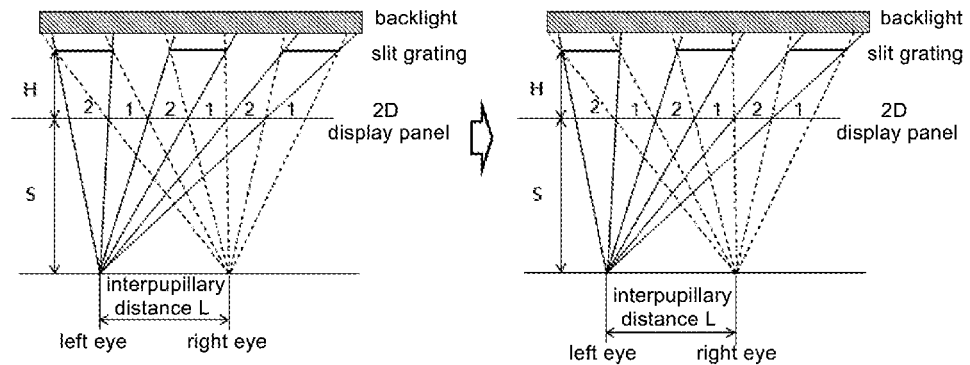
FIG. 2 is a schematic view showing a principle of the generation of a 3D dead zone in the related art.
Figure 7:
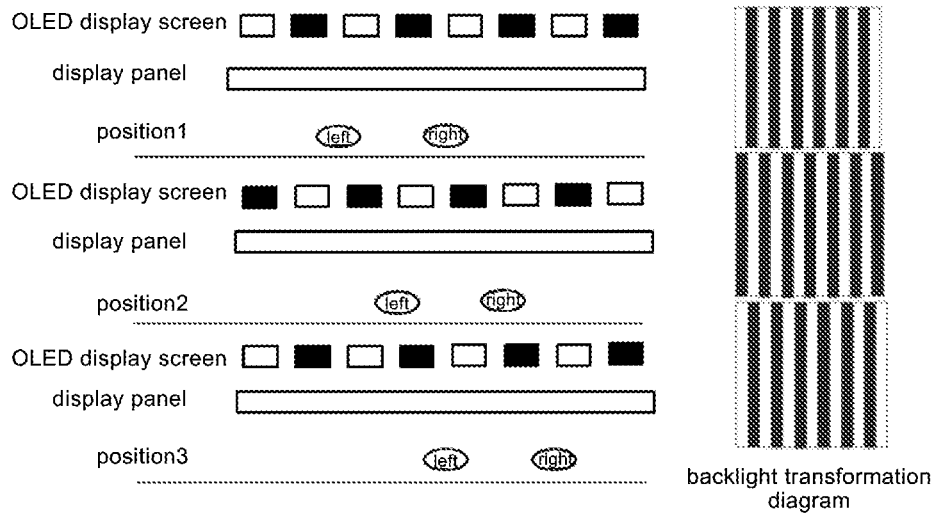
FIG. 7 is another schematic view showing a situation where the 3D dead zone is removed and the crosstalk is reduced according to at least one embodiment of the present disclosure.

As shown in FIG. 7, as compared with the conventional 3D display device in FIG. 1, the 3D display device in the embodiments of the present disclosure includes no splitter such as a lens, and the grating structure is arranged at a rear side of the display panel. In addition, the grating structure is implemented by an OLED display screen, and the size of the OLED display screen matches that of the display panel. To be specific, the white OLED display screen or the red-green-blue OLED display screen may be used. In the case that the white OLED display screen is used as the LED backlight, the display panel may include a color filter, and in the case that the red-green-blue OLED display screen is used as the LED backlight, the display panel may include no color filter. Light-emitting units are composed of pixel units on the OLED display screen, and through the control over the OLED display screen, it is able to flexibly control the turning-on or turning-off of each light-emitting unit. Each light-emitting unit is equivalent to the grating in the non-transparent state in the case of not emitting light, and equivalent to the grating in the transparent state in the case of emitting light. Each light-emitting unit may be of a strip-like, block-like or circular shape. Regardless of the shapes of the light-emitting unit, it may be controlled separately so as to be in a bright or dark state. During the 3D display, the light-emitting unit in the dark state may serve as the grating. Light beams may be appropriately received by the left and right eyes of the viewer in accordance with a light path. In this way, the left and right eyes of the viewer may view different views, which are then combined, in accordance with the 3D fusion principle, in the viewer's brain, so as to form the 3D image and achieve the 3D display effect.

In FIG. 7, on the basis of the distance H between the OLED display screen and the display panel and the distance S between the eyes of the viewer and the display panel, it is able to determine that the light-emitting unit includes n OLED pixel units in an identical column. During the 3D display, the OLED pixel units on the OLED display screen are turned on alternately in such a manner that the OLED pixel units in one column are in the dark state and the OLED pixel units in an adjacent column are in the bright state. In the case that the viewer is located at position 1, the left eye of the viewer may view the view 1, and the right eye may view the view 2. In accordance with the 3D fusion principle, the viewer may view the normal 3D image. In the case that the viewer is moved from the position 1 to a position 2, the positions of the eyes of the viewer may be acquired by the eye tracking unit. To be specific, the eye tracking unit may be implemented by a camera. The control unit may be used to control the OLED pixel units to be turned on in accordance with the positions of the eyes. In this way, even in the case that the viewer is moved, the left eye may still view the view 1 and the right eye may still view the view. As a result, it is still able to view the normal 3D image, prevent the occurrence of the dead zone and reduce the image crosstalk. In the same way, when the viewer is moved from the position 2 to a position 3, the positions of the eyes of the viewer may be acquired by the eye tracking unit. The control unit may be used to control the OLED pixel units to be turned on in accordance with the positions of the eyes. In this way, even in the case that the viewer is moved, the left eye may still view the view 1 and the right eye may still view the view. As a result, it is still able to view the normal 3D image, prevent the occurrence of the dead zone and reduce the image crosstalk due to the confused information.

Figure 8:
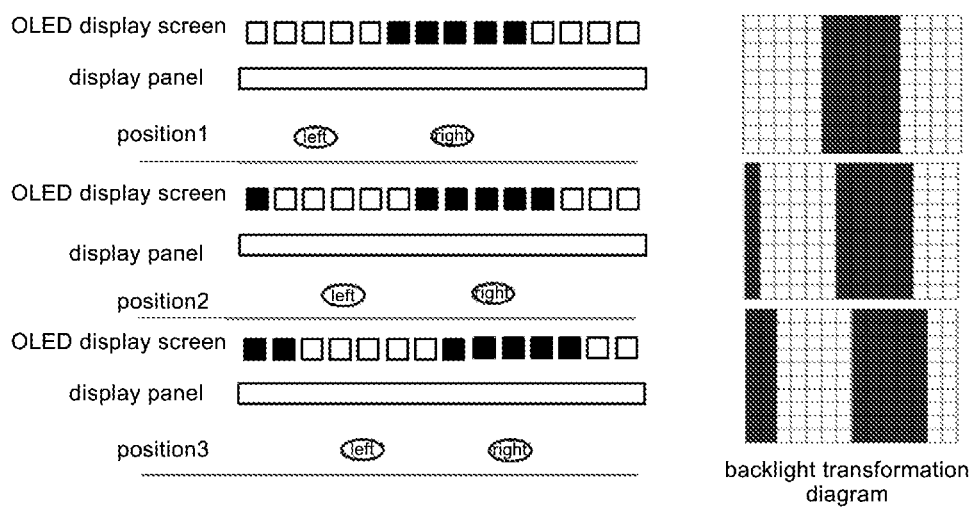
FIG. 8 is yet another schematic view showing a situation where the 3D dead zone is removed and the crosstalk is reduced according to at least one embodiment of the present disclosure.

As shown in FIG. 8, as compared with the conventional 3D display device in FIG. 1, the 3D display device in the embodiments of the present disclosure includes no splitter such as a lens, and the grating structure is arranged at a rear side of the display panel. In addition, the grating structure is implemented by an OLED display screen, and the size of the OLED display screen matches that of the display panel. To be specific, the white OLED display screen or the red-green-blue OLED display screen may be used. In the case that the white OLED display screen is used as the LED backlight, the display panel may include a color filter, and in the case that the red-green-blue OLED display screen is used as the LED backlight, the display panel may include no color filter. The light-emitting unit is composed of pixel units on the OLED display screen, and through the control over the OLED display screen, it is able to flexibly control the turning-on or turning-off of each light-emitting unit. The light-emitting unit is equivalent to the grating in the non-transparent state in the case of not emitting light, and equivalent to the grating in the transparent state in the case of emitting light. The light-emitting unit may be of a strip-like, block-like or circular shape. Regardless of the shapes of the light-emitting unit, it may be controlled separately so as to be in a bright or dark state. During the 3D display, the light-emitting unit in the dark state may serve as the grating. Light beams may be appropriately received by the left and right eyes of the viewer in accordance with a light path. In this way, the left and right eyes of the viewer may view different views, which are then combined, in accordance with the 3D fusion principle, in the viewer's brain, so as to form the 3D image and achieve the 3D display effect.

In FIG. 8, on the basis of the distance H between the OLED display screen and the display panel and the distance S between the eyes of the viewer and the display panel, it is able to determine that the light-emitting unit includes m*n OLED pixel units in m (e.g., 5) adjacent columns. During the 3D display, the OLED pixel units on the OLED display screen are turned on alternately in such a manner that the OLED pixel units in m columns are in the dark state and the OLED pixel units in m adjacent columns are in the bright state. In the case that the viewer is located at position 1, the left eye of the viewer may view the view 1, and the right eye may view the view 2. In accordance with the 3D fusion principle, the viewer may view the normal 3D image. In the case that the viewer is moved from the position 1 to a position 2, the positions of the eyes of the viewer may be acquired by the eye tracking unit. To be specific, the eye tracking unit may be implemented by a camera. The control unit may be used to control the OLED pixel units to be turned on in accordance with the positions of the eyes. In this way, even in the case that the viewer is moved, the left eye may still view the view 1 and the right eye may still view the view. As a result, it is still able to view the normal 3D image, prevent the occurrence of the dead zone and reduce the image crosstalk. Identically, in the case that the viewer is moved from the position 2 to a position 3, the positions of the eyes of the viewer may be acquired by the eye tracking unit. The control unit may be used to control the OLED pixel units to be turned on in accordance with the positions of the eyes. In this way, even in the case that the viewer is moved, the left eye may still view the view 1 and the right eye may still view the view. As a result, it is still able to view the normal 3D image, prevent the occurrence of the dead zone and reduce the image crosstalk due to the confused information.

Figure 9:
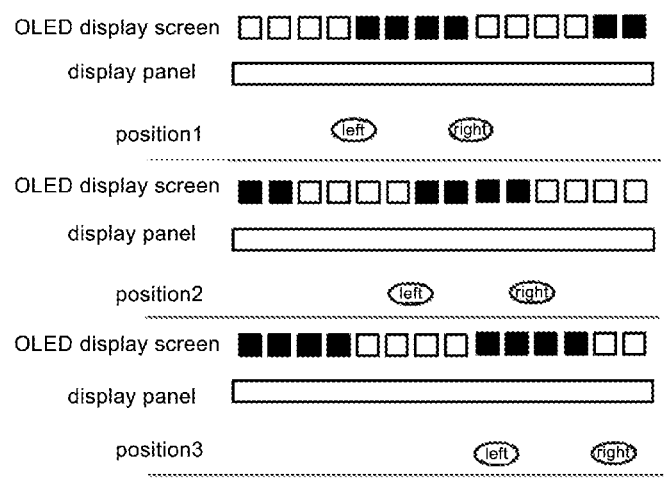
FIG. 9 is still yet another schematic view showing a situation where the 3D dead zone is removed and the crosstalk is reduced according to at least one embodiment of the present disclosure.

As shown in FIG. 9, as compared with the conventional 3D display device in FIG. 1, the 3D display device in the embodiments of the present disclosure includes no splitter such as a lens, and the grating structure is arranged at a rear side of the display panel. In addition, the grating structure is implemented by an OLED display screen, and the size of the OLED display screen matches that of the display panel. To be specific, the white OLED display screen or the red-green-blue OLED display screen may be used. In the case that the white OLED display screen is used as the LED backlight, the display panel may include a color filter, and in the case that the red-green-blue OLED display screen is used as the LED backlight, the display panel may include no color filter. The light-emitting unit is composed of pixel units on the OLED display screen, and through the control over the OLED display screen, it is able to flexibly control the turning-on or turning-off of the light-emitting unit. The light-emitting unit is equivalent to the grating in the nontransparent state in the case of not emitting light, and equivalent to the grating in the transparent state in the case of emitting light. Each light-emitting unit may be of a strip-like, block-like or circular shape. Regardless of the shapes of the light-emitting unit, it may be controlled separately so as to be in a bright or dark state. During the 3D display, the light-emitting unit in the dark state may serve as the grating. Light beams may be appropriately received by the left and right eyes of the viewer in accordance with a light path. In this way, the left and right eyes of the viewer may view different views, which are then combined, in accordance with the 3D fusion principle, in the viewer's brain, so as to form the 3D image and achieve the 3D display effect.

In FIG. 9, on the basis of the distance H between the OLED display screen and the display panel and the distance S between the eyes of the viewer and the display panel, it is able to determine that the light-emitting unit includes 4n OLED pixel units in four adjacent columns. During the 3D display, the OLED pixel units on the OLED display screen are turned on alternately in such a manner that the OLED pixel units in 4 columns are in the dark state and the OLED pixel units in 4 adjacent columns are in the bright state. In the case that the viewer is located at position 1, the left eye of the viewer may view the view 1, and the right eye may view the view 2. In accordance with the 3D fusion principle, the viewer may view the normal 3D image. In the case that the viewer is moved from the position 1 to a position 2, the positions of the eyes of the viewer may be acquired by the eye tracking unit. To be specific, the eye tracking unit may be implemented by a camera. The control unit may be used to control the OLED pixel units to be energized in accordance with the positions of the eyes. In this way, even in the case that the viewer is moved, the left eye may still view the view 1 and the right eye may still view the view. As a result, it is still able to view the normal 3D image, prevent the occurrence of the dead zone and reduce the image crosstalk. In the same way, when the viewer is moved from the position 2 to a position 3, the positions of the eyes of the viewer may be acquired by the eye tracking unit. The control unit may be used to control the OLED pixel units to be turned on in accordance with the positions of the eyes. In this way, even in the case that the viewer is moved, the left eye may still view the view 1 and the right eye may still view the view. As a result, it is still able to view the normal 3D image, prevent the occurrence of the dead zone and reduce the image crosstalk due to the confused information.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A three dimension (3D) display device, comprising a display panel for displaying an image and a grating structure cooperating with the display panel to provide a 3D display effect, wherein the grating structure comprises a plurality of gratings capable of being switched between a transparent state and a nontransparent state, and the 3D display device further comprises:
an eye tracking unit configured to acquire positions of eyes of a viewer; and
a control unit connected to the eye tracking unit and configured to control the gratings to be switched between the transparent state and the nontransparent state in accordance with the positions of the eyes of the viewer, to enable a left eye of the viewer to view a first view displayed on the display panel through the grating structure and enable a right eye of the viewer to view a second view displayed on the display panel through the grating structure,
wherein the grating structure consists of a backlight arranged at a rear side of the display panel, the backlight comprises a plurality of light-emitting units arranged separately, and each of the light-emitting units forms the grating in the transparent state when emitting light and forms the grating in the nontransparent state when not emitting light, and
wherein the control unit further comprises a third controller configured to adjust a size of the light-emitting unit in accordance with a distance between the backlight and the display panel and a distance between a viewer's eyes and the display panel.

2. The 3D display device according to claim 1, wherein the control unit comprises:
a first controller configured to apply a first signal to the display panel, to enable a plurality of first pixel units spaced apart from each other on the display panel to display the first view and enable a plurality of second pixel units each arranged between adjacent first pixel units on the display panel to display the second view; and
a second controller configured to apply a second signal to the grating structure, to enable a plurality of first gratings of the grating structure spaced apart from each other to be in the transparent state and enable a plurality of second gratings of the grating structure each arranged between adjacent first gratings to be in the nontransparent state.

3. The 3D display device according to claim 1, wherein the light-emitting unit is of a circular, rectangular or trapezoidal shape.

4. The 3D display device according to claim 1, wherein the backlight is a white organic light-emitting diode (OLED) display screen or a red-green-blue OLED display screen;
when the backlight is the white OLED display screen, the display panel comprises a color filter;
when the backlight is the red-green-blue OLED display screen, the display panel comprises no color filter.

5. The 3D display device according to claim 4, wherein the light-emitting unit comprises n OLED pixel units in an identical column, and during the 3D display, the OLED pixel units on the OLED display screen are turned on alternately in such a manner that the OLED pixel units in one column are in a dark state and the OLED pixel units in an adjacent column are in a bright state.

6. The 3D display device according to claim 4, wherein the light-emitting unit comprises m*n OLED pixel units in m adjacent columns, and during the 3D display, the OLED pixels units on the OLED display screen are turned on alternately in such a manner that the OLED pixel units in m columns are in a dark state and the OLED pixel units in m adjacent columns are in a bright state.

7. A method for controlling a three dimension (3D) display device, the 3D display device comprising a display panel for displaying an image and a grating structure cooperating with the display panel to provide a 3D display effect, the grating structure comprising a plurality of gratings capable of being switched between a transparent state and a nontransparent state, the method comprising steps of:
- acquiring positions of eyes of a viewer;
- adjusting a size of the light-emitting unit in accordance with a distance between the backlight and the display panel and a distance between the viewer's eyes and the display panel; and
- controlling the gratings to be switched between the transparent state and the nontransparent state in accordance with the positions of the eyes of the viewer, to enable a left eye of the viewer to view a first view displayed on the display panel through the grating structure and enable a right eye of the viewer to view a second view displayed on the display panel through the grating structure,
- wherein the grating structure consists of a backlight arranged at a rear side of the display panel, the backlight comprises a plurality of light-emitting units arranged separately, and each of the light-emitting units forms the grating in the transparent state when emitting light and forms the grating in the nontransparent state when not emitting light.

8. The method according to claim 7, wherein the step of controlling the gratings to be switched between the transparent state and the nontransparent state in accordance with the positions of the eyes of the viewer, to enable the left eye of the viewer to view the first view displayed on the display panel through the grating structure and enable the right eye of the viewer to view the second view displayed on the display panel through the grating structure comprises:
- applying a first signal to the display panel, to enable a plurality of first pixel units spaced apart from each other on the display panel to display the first view and enable a plurality of second pixel units each arranged between the adjacent first pixel units on the display panel to display the second view; and
- applying a second signal to the grating structure, to enable a plurality of first gratings of the grating structure spaced apart from each other to be in the transparent state and enable a plurality of second gratings of the grating structure each arranged between the adjacent first gratings to be in the nontransparent state.

9. The method according to claim 7, wherein the light-emitting unit comprises n OLED pixel units in an identical column, and during the 3D display, the OLED pixel units on the OLED display screen are turned on alternately in such a manner that the OLED pixel units in one column are in a dark state and the OLED pixel units in an adjacent column are in a bright state.

10. The method according to claim 7, wherein the light-emitting unit comprises m*n OLED pixel units in m adjacent columns, and during the 3D display, the OLED pixels units on the OLED display screen are turned on alternately in such a manner that the OLED pixel units in m columns are in a dark state and the OLED pixel units in m adjacent columns are in a bright state.

11. The 3D display device according to claim 1, comprising no light splitter.

12. The 3D display device according to claim 11, comprising no lens.

* * * * *